United States Patent [19]

Lampart et al.

[11] 4,086,314

[45] Apr. 25, 1978

[54] METHOD OF AND APPARATUS FOR THE PRODUCTION OF THERMOPLASTIC CONTAINERS

[75] Inventors: Dieter Lampart, Ettlingen; Kalman Körmendi, Karlsruhe, both of Germany

[73] Assignee: Elbatainer Kunststoff- und Verpackungs-Gesellschaft mbH, Ettlingen, Baden, Germany

[21] Appl. No.: 782,850

[22] Filed: Mar. 30, 1977

[30] Foreign Application Priority Data

Mar. 31, 1976 Germany .............................. 2613689

[51] Int. Cl.² ............................................. B29C 17/07
[52] U.S. Cl. ........................................ 264/89; 264/98; 425/525
[58] Field of Search ............... 425/525, 529, 535, 522, 425/528; 264/98, 99, 89

[56] References Cited

U.S. PATENT DOCUMENTS 3,564,087  2/1971  Ruekberg ......................... 264/98 X
3,983,199  9/1976  Uhlig ................................. 264/98

FOREIGN PATENT DOCUMENTS 1,479,216  5/1969  Germany .............................. 264/98

Primary Examiner—Francis S. Husar
Assistant Examiner—William R. Briggs
Attorney, Agent, or Firm—Montague & Ross

[57] ABSTRACT

Plastic containers, especially of large volume, for the storage, dispensing and transportation of liquids such as milk are formed by blow-molding unitarily with handgrips and recesses permitting the engagement thereof. According to the disclosure, a parison is extruded into a blow mold and before the blow mold is closed on the parison, a lower portion thereof is distended outwardly with the outwardly expanded or distended portions being gripped by members which draw these portions laterally outwardly into auxiliary molding devices designed to shape these portions into the handgrips upon closure of the mold and the blowing of the parison to conform to the contours thereof. Thus, the grip portions are formed from extra material extruded from the extrusion head forming the parison.

9 Claims, 10 Drawing Figures

EXTRUDER HEAD

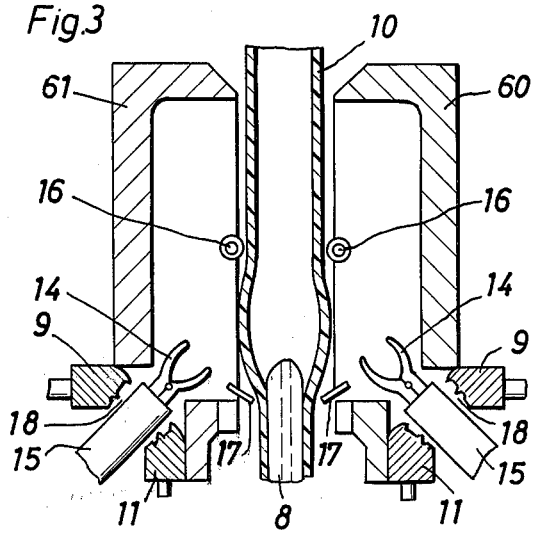
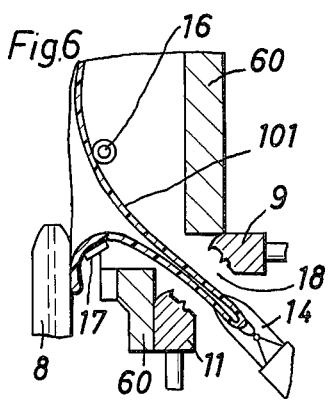
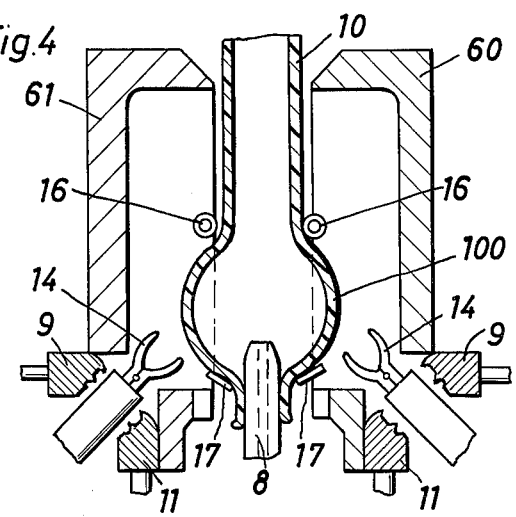
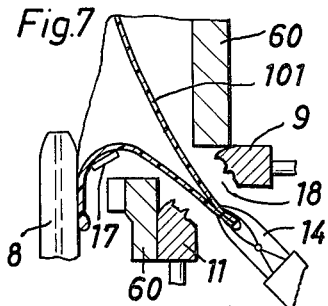
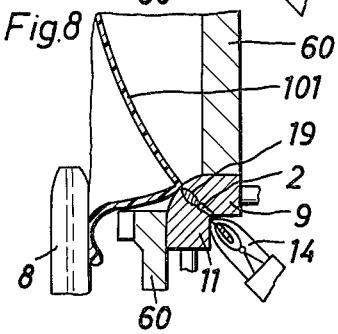
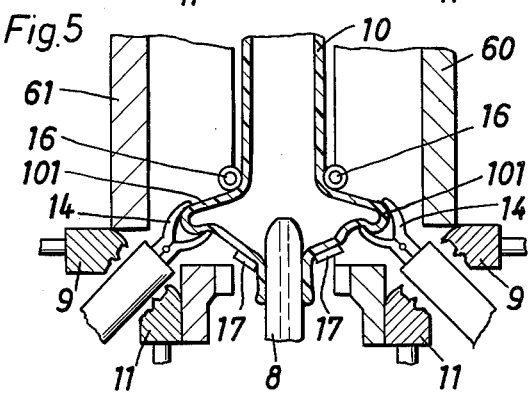
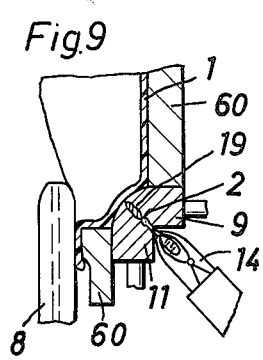

METHOD OF AND APPARATUS FOR THE PRODUCTION OF THERMOPLASTIC CONTAINERS

FIELD OF THE INVENTION

The present invention relates to the formation of containers by blow-molding and, more particularly, to a method of and an apparatus for the blow-molding of large-volume containers, especially for liquids, unitarily and integrally with handgrips facilitating the manipulation of the container.

BACKGROUND OF THE INVENTION

In the blow-molding of containers, the procedure usually followed is to extrude a synthetic-resin thermoplastic parison from an extrusion head into the path of a closable blow mold, to close this mold on the plastically deformable parison, and to introduce air or some other fluid under pressure into the parison to expand the latter against the inner wall of the mold cavity defined by the blow mold to impart the desired shape to the parison. The mold article is then cooled so that its shape is retained, the blow mold is opened and the finished article is removed.

Where large-volume containers are of interest, it is desirable to equip them with the usual fitting for filling and dispensing the contents, e.g. a thickened mouth and/or neck which can be provided with a cover, if desired, and with a handgrip or handle to facilitate manipulation of the container. Such containers may be used for the transportation, storage and dispensing of a variety of liquids, e.g. milk, oil.

It has been proposed heretofore to provide synthetic-resin containers such as canisters by blow-molding processes so that during the blow-molding operation, the handgrip members are fused to the walls of the container. This can be accomplished by prefabricating the grip, laying it into the blow mold and fusing the grip to the thermoplastic material of the parison during the blowing operation. This mode of manufacture is expensive and unreliable because the step of inserting the prefabricated grip into the blowing mold interrupts the continuity of the working cycle. Furthermore, the bond between the prefabricated grip and the container formed by blowing is frequently insecure since it depends upon the nature of the materials constituting the prefabricated grip and the parison, upon variations in thickness and hence the prefabrication techniques, etc. For instance, a nonuniform preheating of the prefabricated grip or the formation of oxide layers upon the latter will detrimentally affect the fusion between the wall of the parison and this separately fabricated element.

To obviate this disadvantage it has already been proposed (see German Patent No. DT-PS 11 76 829) to form the handgrips directly upon the container by introducing the parison into the blow mold which is provided, at the portions which close against one another to form a common edge or seam, with formations engaging outwardly bulging parts of the parison. The edges thus engage such outwardly bulging parts and shape the latter into the handgrip configuration by welding opposing wall portions together and producing a sectoral recess or cutout adapted to enable the fingers of the hand of the user to pass around the grip.

The disadvantage of this system, in spite of the fact that it eliminates the need to interrupt the container-producing cycle, is that portions of the parison must be introduced into formation by blowing them into the sector-shaped elements provided with these formations. As a consequence, the material of the parison stretches nonuniformly in these regions and the portions of the thermoplastic material tend to cool upon contact with the aforementioned elements so that the blowing is not always effective. This leads to weakening of the container wall in the region of the grips and incompletely formed handgrip members unless special steps are provided to ensure full positioning of the wall portions of the parison in the forming elements. In fact, experience has shown that there was a tendency for the container wall to tear at the region of the handgrips. As a consequence earlier processes of the aforedescribed type have proved to be impractical for mass production.

OBJECTS OF THE INVENTION

It is the principal object of the present invention to provide an improved process for the fabrication of containers from thermoplastic synthetic resins unitarily with handgrips whereby the aforementioned disadvantages are obviated.

Still another object of the invention is to provide an improved apparatus for producing such containers.

It is a further object of the invention to provide a method of and an apparatus for the production of containers with handgrips in a single operation, without weakening of the junctions between the handgrip and the container wall, with high reliability and, particularly, suitability for mass production.

SUMMARY OF THE INVENTION

These objects and others which will become apparent hereinafter are attained, in accordance with the present invention, in a process or method wherein, after the introduction of the normal length of plastically deformable parison into the open blow mold and spreading of the lower part of the tubular parison thus introduced, additional synthetic-resin material is fed downwardly so that the lower portion can be expanded to have an elongated balloon-like configuration. According to a feature of the invention, upper and lower portions of the balloon-like bulge are then pressed together on opposite sides of the parison to produce lateral projections which are engaged and drawn downwardly and outwardly into engagement by shaping elements which produce the handgrip formations.

According to an important feature of the invention, the lateral protuberances are engaged by respective grippers which more downwardly and outwardly to draw the pressed-together portions into the grip-shaping elements which close upon the outwardly drawn portions of thermoplastic material. The blow mold is then closed and the remainder of the parison therein is blown (expanded) to the contours of the mold cavity defined by the blow mold.

With the system of the present invention, therefore, the handgrip and the respective recess or trough by which the grip is spaced from the opposing wall of the container are formed not from the normal length of parison but from additional parison material which is fed by the extruder into the region of the blow mold. Excessive stretching of the parison material and stressing thereof is avoided and the grip portions always have the same thickness.

According to another aspect of the invention, an apparatus for carrying out the process comprises a separable blow mold together with guide members on opposite sides of the parison which can be introduced into the blow-mold region in the open condition thereof and which are movable downwardly toward flat supporting members to press the outwardly bulging portions together to form the aforementioned protuberances. The apparatus also comprises grippers for engagement with these protuberances.

According to a feature of the invention, the bulge-displacing elements or rods are coated with chemically resistant and heat-resistant material, such as polytetrafluoroethylene and/or are provided with rollers to reduce frictional engagement with the parison, these rollers being coated with the polytetrafluoroethylene. It has also been found to be advantageous to coat the flat supporting surfaces, which also can be laterally withdrawn from the path of the mold halves, with polytetrafluoroethylene.

The gripper for each of the protuberances formed between the downwardly displaced elements and the flat supporting members is displaceable into and out of the space between the mold halves and can be provided as gripper tongs or vacuum grippers.

The forming elements adapted to shape the handgrips of the container can comprise angle sliders or rotary sliders as required. Best results are obtained, however, when the forming elements are constituted by a pair of slides, one of which moves horizontally while the other moves vertically at each of a pair of opposite edges of the container, the two slides being urged toward one another to cut through the downwardly and outwardly drawn portions of the parison to provide the grip opening and shape the grip bar.

The system of the invention has certain advantages which will be readily apparent. For example, since the grip shaping operation uses additionally provided material, the parison is not overstretched or excessively drawn by the grip-shaping operation. This prevents weakening or tearing and renders the process of the invention particularly suitable for the mass production of fully identical containers of constant wall thickness and shape.

In addition, the wall thickness can be maintained substantially constant along the surface of the parison at which the handgrip is provided in spite of the formation of the handgrip from the material of the parison itself. This is unusual in containers formed integrally with the handgrip members. Since it is not necessary to blow the parison into the clamping edges of the blow mold, with the aforementioned disadvantages, the uniformity of the container from one cycle to the other remains constant. While, in the past, is has been necessary to compensate for the nonuniformity of wall thickness by making the parison thicker so that at the point of greatest thickness reduction it will have the necessary thickness, this is no longer required and hence the entire parison can be made somewhat thinner. Hence, in spite of the fact that additional material is fed from the extruder to form the parison in the system of the present invention, it is found that the total quantity of material used per container may be reduced over the systems of the prior art.

BRIEF DESCRIPTION OF THE DRAWING

The above and other objects, features and advantages of the present invention will become more readily apparent from the following description, reference being made to the accompanying drawing in which:

FIG. 1A is a section taken along the line IA—IA of FIG. 1;

FIGS. 3 through 5 are cross-sectional views showing the open blow mold of FIG. 2 in successive operations during the formation of the lateral bulges; and FIGS. 6 through 9 are partial cross-sections showing the engagement of a bulge by a gripper in successive operations according to the invention.

SPECIFIC DESCRIPTION

Figure 1:
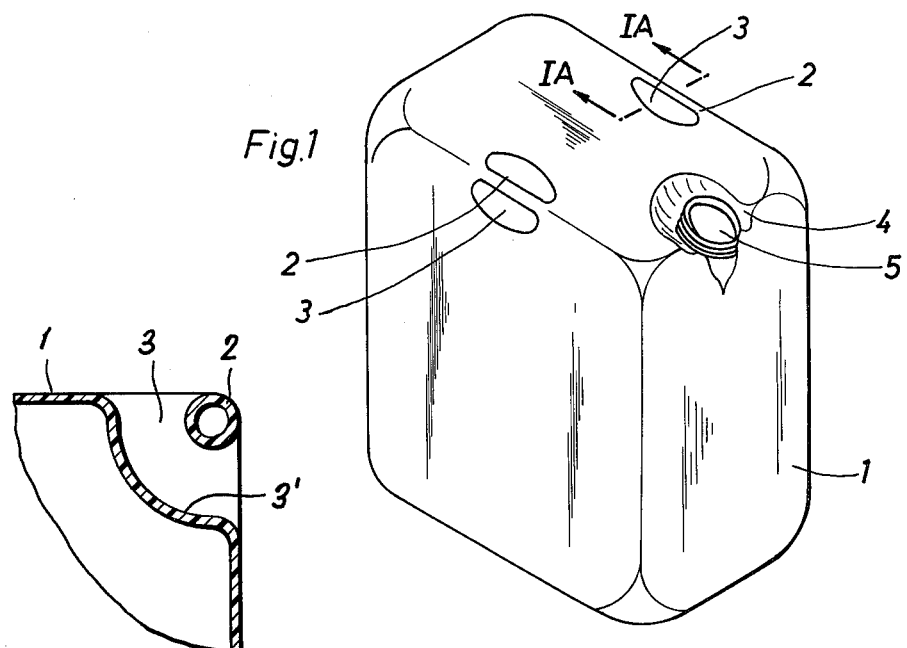
FIG. 1 is a perspective view of a container fabricated in accordance with the principles of the present invention.

The container 1 illustrated in FIG. 1 is formed in a single blow-molding operation simultaneously and unitarily with handgrips 2 which are each separated by an opening 3 from the opposing wall 3' of the container. In addition, the container has an inwardly disposed wall section 4 unitarily formed with a filling and emptying fitting neck or mount represented diagrammatically at 5 and adapted to receive a cover.

Figure 2:
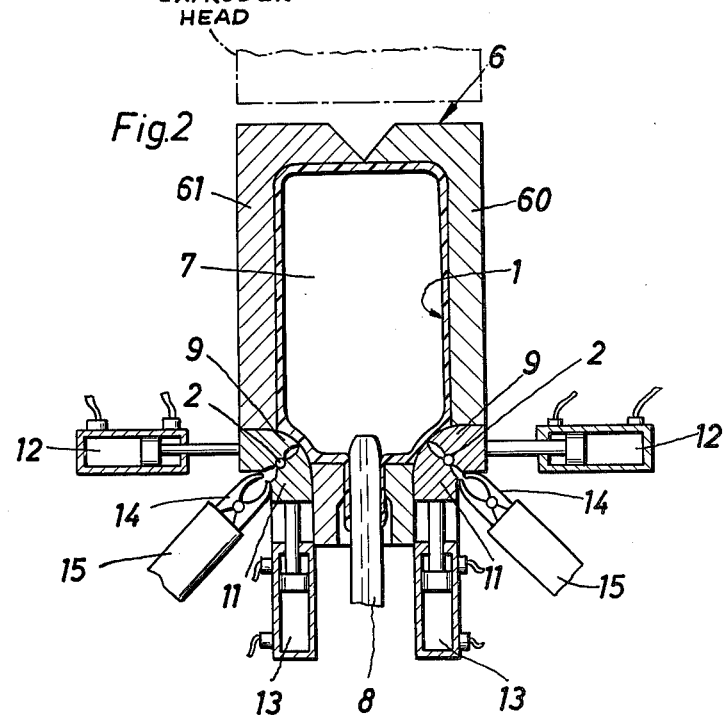
FIG. 2 is a vertical cross-sectional view through a blow mold according to the present invention, various structures for displacing the moving parts being omitted as irrelevant to the principles of the invention.

The container 1, which is shown in its finished state in the blow mold of FIG. 2, is produced in a blow mold 6 having a pair of mold halves 60 and 61 which define a mold cavity 7 in a closed condition having the shape of the container 1 illustrated in FIG. 1.

The apparatus comprises a spreading and blowing mandrel and, on each side of the blow mold, a pair of grip-shaping elements (dies) 9 and 11 which are shiftable, respectively, horizontally and vertically to produce the grip configuration 2, 3, 3' previously described.

The grip-shaping elements 9 and 11 are provided with gripper tongs 14 which can be actuated by means not shown but represented diagrammatically at 15 whereby these tongs can be displaced into the mold cavity 7 (FIGS. 3 through 5) and can be withdrawn downwardly and outwardly in the positions illustrated in FIG. 2. In addition, the elements 9 and 11 are replaceable by respective hydraulic cylinder units 12 and 13.

At the beginning of the blow molding operation, a tubular parison 10 is extruded downwardly from an extrusion press head of conventional construction (not shown) into the space 7 between the open mold halves 60 and 61. The bottom of the parison is penetrated and spread by the spreading mandrel 8 extending parallel to the longitudinal direction of the closing edges of the mold halves 60, 61; this mandrel serving in part to support the parison.

A pair of displacement rods 16, provided with rollers coated with polytetrafluoroethylene, are then introduced laterally into the space between the mold halves as are a pair of lower flat supporting bars 17, similarly coated with polytetrafluoroethylene.

The upper members 16 flank the parison 10 (FIG. 3) and are moved downwardly toward the spreading and blowing mandrel 8. During the downward movement, addition parison material is introduced from the above into the mold cavity and an elongated balloon-shaped bulge 100 is formed below the members 16 and rests upon the support bars 17 (FIG. 4).

During further downward movement of members 16, the bulge 100 is pressed together to produce outwardly projecting protuberances 101 (FIG. 5). Prior thereto the open gripper tongs 14 were advanced into the mold cavity (FIGS. 3 through 5) so that the protuberances each engage in the respective pair of tongs which is then closed. The grippers 14 are then withdrawn (FIG. 6) to carry each protuberance 101 outwardly and downwardly between the respective pair of open grip-shaping dies 9 and 11.

The dies 9 and 11 are then closed (FIG. 8) upon the respective protuberances and are released by the gripper 14 or can continue to be held thereby until the conclusion of the blow molding operation. As can be seen from FIG. 8, the engagement of the protuberances 101 by die members 9 and 11 does not permit contact of the mold wall with the parison.

The blow mold is then closed (FIG. 9) and the container is blown. Cooling provides the configuration of the container shown in FIG. 1. After cooling, the mold 6 is opened and the finished container is removed without requiring further operations to produce the grip. The material cut out to form the opening 1 is simply dropped or is removed upon opening of members 9 and 11. The process is then repeated.

We claim:

1. A process for producing a container comprising the steps of:
   feeding a thermoplastic tubular parison downwardly into an open blow mold defining in a closed position a mold cavity having a shape of a container to be produced;
   introducing a blowing mandrel into the lower end of said parison and spreading said lower end to form an elongated balloon-shaped bulge therein;
   pressing upper and lower portions of said bulge together while continuing to feed said parison downwardly on at least one side of said parison to produce a lateral protuberance on said side;
   gripping said protuberance and drawing same downwardly and outwardly between a pair of grip-shaping dies adapted to form a grip and opening around said grip in the wall of the parison;
   closing said die on said protuberance;
   closing said blow mold; and
   introducing air through said mandrel to expand the parison in said cavity to the configuration thereof, thereby forming said container unitarily with a handgrip.

2. An apparatus for producing a container comprising:
   a pair of mold halves closeable to define a mold cavity having the configuration of a container to be produced and separatable to form a gap between them, said mold cavity receiving a parison from above;
   means above said mold halves for feeding said parison downwardly;
   a blowing and spreading mandrel extending upwardly between said mold halves for engagement with the lower portion of said parison, whereby further advance of material of said parison toward said mandrel producing a bulge in the lower portion thereof;
   a pair of rods and means displacing said rods to insert them into said gap above said lower portion with said rods flanking said parison, and displacing said rods downwardly to press upper portions of said bulge downwardly;
   a pair of flat support members disposed below said rods for supporting said bulge on opposite sides of said parison, whereby said rods press said upper portions of said bulge toward said support members and produce lateral protuberances of said parison;
   respective grippers operable to engage said protuberances;
   means displacing said grippers downwardly and outwardly to draw said protuberances and outwardly;
   respective pairs of grip-shaping die elements at the bottom of said cavity; and
   means displacing said elements into engagement with the outwardly and downwardly drawn protuberances for shaping the same into respective grips and grip openings.

3. The apparatus defined in claim 2 wherein said rods are coated with polytetrafluoroethylene.

4. The apparatus defined in claim 2 wherein said rods carry respective rollers engageable with said parison, said rollers being coated with polytetrafluoroethylene.

5. The apparatus defined in claim 2 wherein said support members are bars coated with polytetrafluoroethylene.

6. The apparatus defined in claim 2 wherein said grippers are formed with tongs shiftable towards and away from said parison.

7. The apparatus defined in claim 2 wherein said grippers are vacuum grippers shiftable toward and away from said parison.

8. The apparatus defined in claim 2 wherein said die elements are displaceable to engage said protuberances.

9. The apparatus defined in claim 8 wherein each pair of die elements comprises a horizontally shiftable die element and a vertically shiftable die element engaging the respective protuberance between them.

* * * * *